United States Patent
Fukasawa (10) Patent No.: US 7,168,409 B2
(45) Date of Patent: Jan. 30, 2007

(54) CONTROLLER FOR DIRECT INJECTION INTERNAL COMBUSTION ENGINE

(75) Inventor: Osamu Fukasawa, Nagoya (JP)

(73) Assignee: Denso Corporation, Kariya (JP)

( * ) Notice: Subject to any disclaimer, the term of this patent is extended or adjusted under 35 U.S.C. 154(b) by 57 days.

(21) Appl. No.: 11/050,822

(22) Filed: Jan. 27, 2005

(65) Prior Publication Data
US 2005/0166891 A1   Aug. 4, 2005

(30) Foreign Application Priority Data
Jan. 30, 2004   (JP)   ............... 2004-022931

(51) Int. Cl.
*F02D 41/40*   (2006.01)
*F01L 1/34*   (2006.01)
(52) U.S. Cl. ............... 123/305; 123/568.14; 123/90.15
(58) Field of Classification Search ............... 123/305, 123/90.11, 90.15, 435, 436, 568.14, 472, 123/492–494; 701/103–105
See application file for complete search history.

(56) References Cited

U.S. PATENT DOCUMENTS

| | | | |
|---|---|---|---|
| 6,305,364 B1 * | 10/2001 | Ma ................. | 123/568.14 |
| 6,543,411 B2 * | 4/2003 | Raab et al. ........... | 123/305 |
| 6,792,912 B2 * | 9/2004 | Kikuchi et al. ............. | 123/294 |
| 6,948,310 B2 * | 9/2005 | Roberts et al. ............... | 60/285 |
| 6,971,338 B2 * | 12/2005 | Kobayashi et al. ........... | 123/21 |
| 7,063,070 B2 * | 6/2006 | Mashiki .................. | 123/431 |
| 2006/0037306 A1 * | 2/2006 | Pozar et al. .................. | 60/285 |

FOREIGN PATENT DOCUMENTS

| | | | |
|---|---|---|---|
| JP | 5-79370 | | 3/1993 |
| JP | 7-151006 | * | 6/1995 |
| JP | 8-232711 | * | 9/1996 |
| JP | 10-131786 | | 5/1998 |
| JP | 2000-110618 | * | 4/2000 |
| JP | 2004-232575 | | 8/2004 |
| JP | 2005-214102 | * | 8/2005 |
| JP | 2006-17053 | * | 1/2006 |

* cited by examiner

*Primary Examiner*—Hai Huynh
(74) *Attorney, Agent, or Firm*—Nixon & Vanderhye, P.C.

(57) ABSTRACT

A direct injection engine is provided with valve timing controllers in an intake side and an exhaust side. While the engine is running in a homogeneous combustion mode, a computer determines whether a valve overlap period exists, in which both the intake valve and the exhaust valve are opened. When the valve overlap period exists, the fuel injection timing is established within a valve overlap period to increase a temperature in a cylinder, so that an atomization of the injected fuel is expedited. When no valve overlap exists, the fuel injection timing is established at the vicinity of the valve opening timing of the intake valve, whereby the atomization of the injected fuel is expedited.

16 Claims, 7 Drawing Sheets

CONTROLLER FOR DIRECT INJECTION INTERNAL COMBUSTION ENGINE

CROSS REFERENCE TO RELATED APPLICATION

This application is based on Japanese Patent Application No. 2004-022931 filed on Jan. 30, 2004, the disclosure of which is incorporated herein by reference.

FIELD OF THE INVENTION

The present invention relates to a controller for a direct injection internal combustion engine, which improves a combustion stability of homogeneous combustion.

BACKGROUND OF THE INVENTION

A direct injection internal combustion engine has been popular. The direct injection internal combustion engine, which is referred to as a DI engine hereinafter, has characters such as a high fuel economy, a low emission and a high power. The DI engine is operated in either a stratified combustion mode or a homogeneous combustion mode. The stratified combustion mode is carried out in a case of a low-load of the engine, and the homogeneous combustion mode is carried out in case of a middle and high-load of the engine.

In order to improve a combustion stability in the stratified combustion mode, it is proposed that a fuel injection timing and/or a pressure of injecting fuel, which is referred to as a fuel pressure hereinafter, is varied. JP-5-79370A shows that a fuel injection timing is varied according to an engine load in the stratified combustion mode. That is, the fuel injection timing is advanced to a primary stage of intake stroke when the engine load is lower than a predetermined value, and is retarded to a middle stage of intake stroke when the engine load is higher than the predetermined value.

Generally, since the fuel injection amount is increased in a high-load of the engine, a period for atomizing the injected fuel increases. In JP-5-79370A, since the fuel injection timing is retarded to the middle stage of the intake stroke in case of the high-load of the engine, a period from the fuel injection timing to an ignition timing is reduced. When a mount of injected fuel is relatively large and/or a velocity of intake air is relatively low, the ignition is carried out before the injected fuel is atomized enough, so that an emitted amount of hydrocarbon (HC) and a smoke can be increased. When the fuel injection timing is advanced to the primary stage of intake stroke in the case that the engine load is lower than the predetermined value, the period for atomizing the injected fuel is enough. However, a position of a piston is close to a top dead center (TDC) and a fuel injector, so that an amount of fuel adhering to the piston can be increased to deteriorate the emission and to generate a smoke of a spark plug. The fuel adhering to the piston is referred to as a piston-wet hereinafter.

JP-10-131786A shows that the fuel pressure is varied according to a speed of a vehicle in case of the homogeneous combustion mode. When the speed of the vehicle is low, the period from the fuel injection timing to the ignition timing is increased. Considering such a situation, the fuel pressure is decreased and the fuel injection period is increased to expedite a mixture of injected fuel and an intake fresh air. In the event of high speed of the vehicle, the fuel pressure is set to a high value to decrease the injection period.

However, since the amount of injected fuel is increased in the case of the high speed of the vehicle, a high fuel pressure causes an increase of the piston-wet, so that the emission can be deteriorated and the smoke of the spark plug can be generated.

SUMMARY OF THE INVENTION

The present invention is made in view of the foregoing matter and it is an object of the present invention to provide a controller for direct injection internal combustion engine which can expedite an atomization of the injected fuel to reduce the piston-wet and can improve a combustion stability of the homogeneous combustion.

According to the present invention, a controller for a direct injection internal combustion engine provided with a valve timing controller of at least an intake valve includes a valve overlap determining means for determining whether a valve overlap period exists, and a fuel injection timing establishing means for establishing a fuel injection timing within a valve overlap period when the valve overlap exists. Both the intake valve and an exhaust valve are opened in the valve overlap period.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENT

[First Embodiment]

A first embodiment of the present invention will be described hereinafter with reference to FIGS. 1 to 4.

Figure 1:
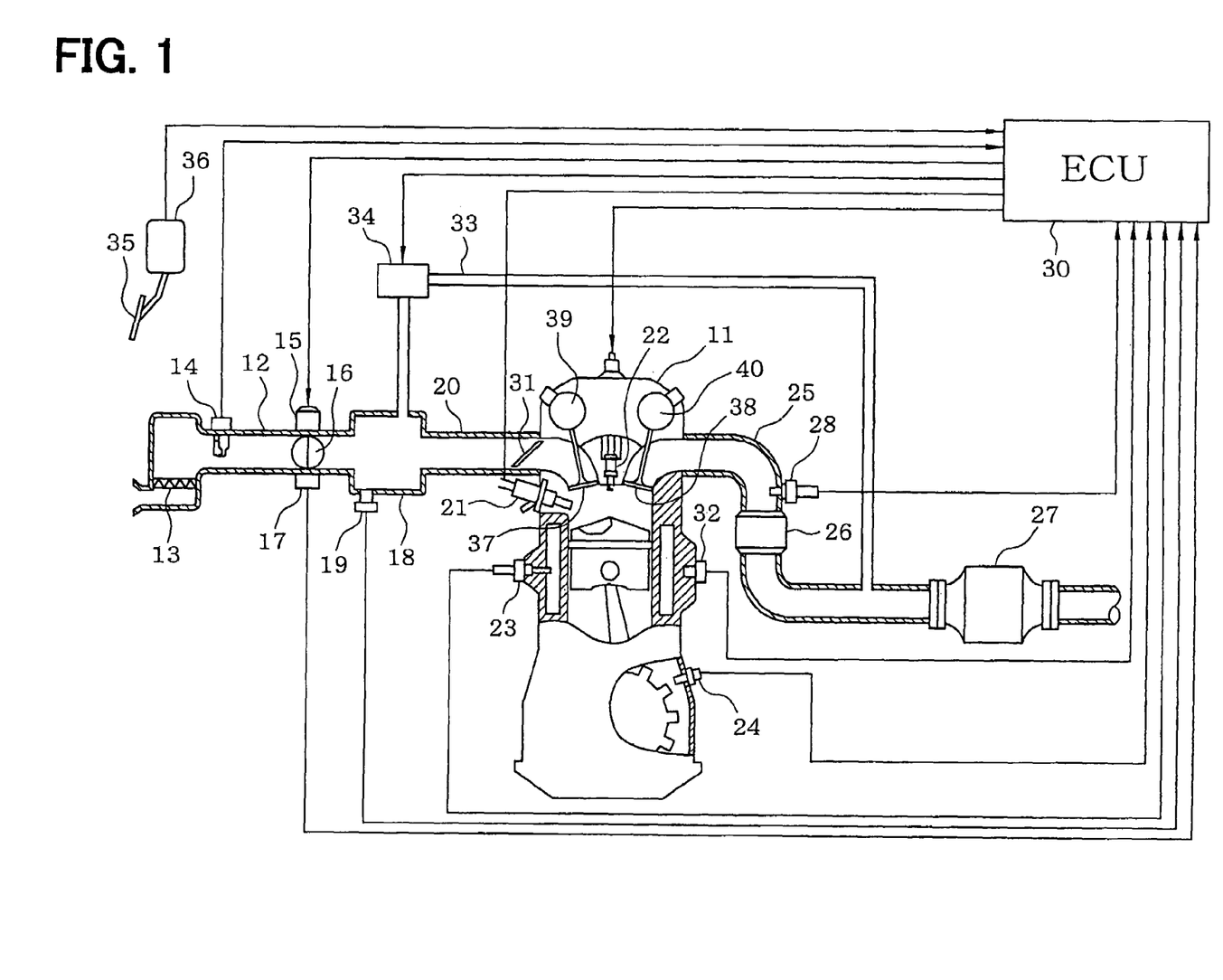
FIG. 1 is a schematic over view of an engine control system according to a first embodiment of the present invention.

The schematic construction of the entirety of an engine control system is illustrated in FIG. 1. An engine 11 is provided with an air cleaner 13 at the most upstream portion of an intake pipe 12 and with an air flow meter 14 for detecting an intake airflow on the downstream side of the air cleaner 13. On the downstream side of the air flow meter 14, there are disposed a throttle valve 16 having an opening adjusted by a DC motor 15 or the like, and a throttle opening sensor 17 for detecting the throttle opening.

On the downstream side of the throttle valve 16, moreover, there is disposed a surge tank 18, which is provided with an intake pipe pressure sensor 19 for detecting the intake pipe pressure. Moreover, the surge tank 18 is provided with an intake manifold 20 for introducing the intake air into the individual cylinders of the engine 11. The intake manifold 20 is provided with an airflow-control valve 31, which controls an intensity of swirl airflow and tumble airflow in the cylinder.

Fuel injection valves 21 for individually injecting the fuel are attached to the vicinities of the intake ports of the intake manifold 20 of the individual cylinders. To the cylinder head of the engine 11, moreover, there are attached ignition plugs 22 for the individual cylinders, so that the air/fuel mixtures in the cylinders are ignited by the spark discharges of the individual ignition plugs 22.

The engine 11 has an intake valve 37 and an exhaust valve 38, which are respectively provided with valve timing controllers 39, 40, which respectively vary the opening/closing timings of the valves 37, 38.

To the cylinder block of the engine 11, moreover, there are attached a coolant temperature sensor 23 for detecting the temperature of coolant, and a crank angle sensor 24 for outputting a pulse signal each time the crankshaft of the engine 11 turns a predetermined crank angle. The crank angle and the engine speed are detected on the basis of the output signal of the crank angle sensor 24. A knock sensor 32 detecting a knocking of the engine is attached on the cylinder block of the engine 11.

The engine 11 has an exhaust pipe 25, which is provided with an upstream catalyst 26 and a downstream catalyst 27. An exhaust gas sensor 28, such as an air-fuel ratio sensor and an oxygen sensor, which detects an air-fuel ratio of the exhaust gas or detects a richness/leanness of the exhaust gas is provided upstream of the upstream catalyst 26. In this embodiment, the upstream catalyst 26 is a three-way catalyst which can purify CO, HC, $NO_x$ in the exhaust gas. The downstream catalyst is a occluding reducing catalyst 27 which occludes $NO_x$ in the case that the air-fuel ratio is lean and reduces $NO_x$ in the case that the air-fuel ratio is approximate to stoichiometric ratio or rich.

An EGR pipe 33 connects the exhaust pipe 25 downstream of the upstream catalyst 26 to the surge tank 18 of the intake pipe 12. A part of the exhaust gas is recirculated from the exhaust pipe 25 to the intake pipe 12 through the EGR pipe 33. An EGR valve 34 controlling an amount of recirculating exhaust gas is provided in the EGR pipe 33. A position of an accelerator 35 is detected by an accelerator sensor 36.

The outputs of the sensors are inputted to an electric control circuit 30, which is referred to as ECU 30 hereinafter. The ECU 27 is constructed mainly of a microcomputer including ROM. The ECU 30 executes the various engine control programs stored in the ROM thereby to control the fuel injection rate of the fuel injection valve 21 and the ignition timing of the ignition plug 22 in accordance with the engine running state. Furthermore, the ECU 30 controls the valve timing controllers 39, 40 so that actual valve timings of the intake valve 37 and the exhaust valve 38 are consistent with target valve timings.

The ECU 30 changes the combustion mode between the stratified combustion mode and the homogeneous combustion mode according to the engine running state, such as a required torque and an engine speed. In the stratified combustion mode, a small amount of fuel is injected into the cylinder at a compressing stroke for generating a stratified mixture of the fuel and air at a vicinity of the spark plug 22 to enhance the fuel economy. In the homogeneous combustion mode, an amount of injected fuel is increased at an intake stroke for generating a homogeneous mixture to enhance the power of engine.

Figure 2:
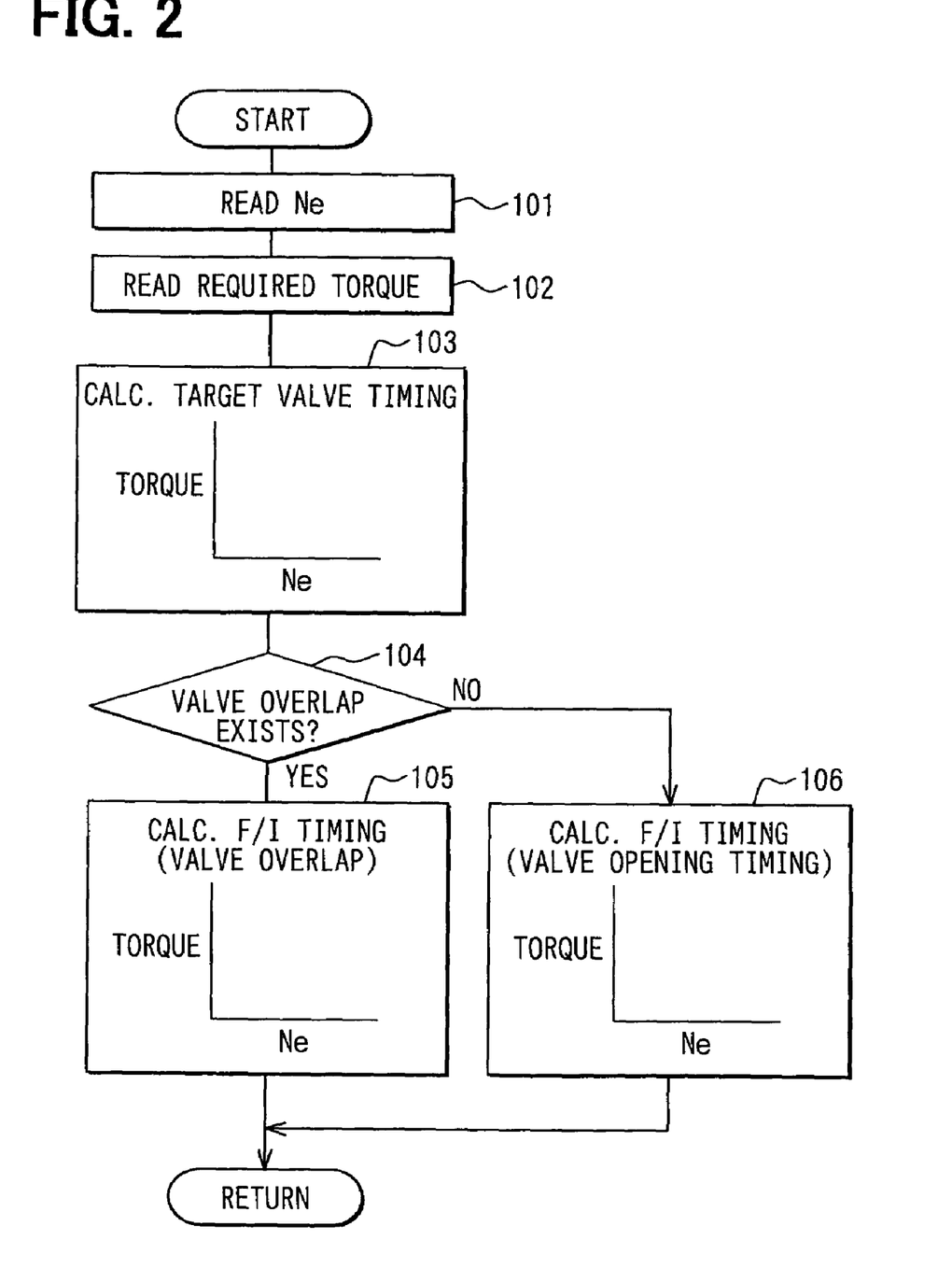
FIG. 2 is a flowchart showing a process of a fuel injection timing calculation routine according to the first embodiment.
Figure 3:
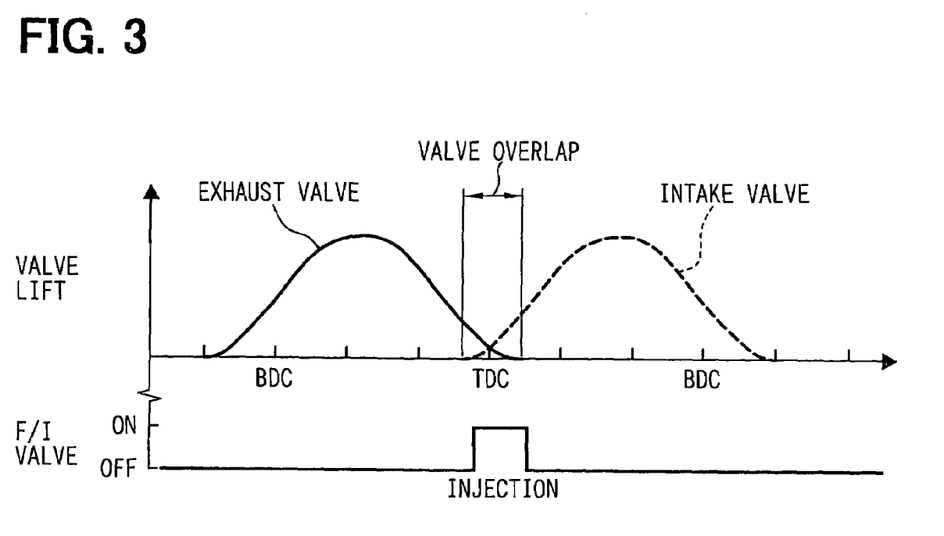
FIG. 3 is a time chart for explaining a fuel injection timing in the case that a valve overlap exists.
Figure 4:
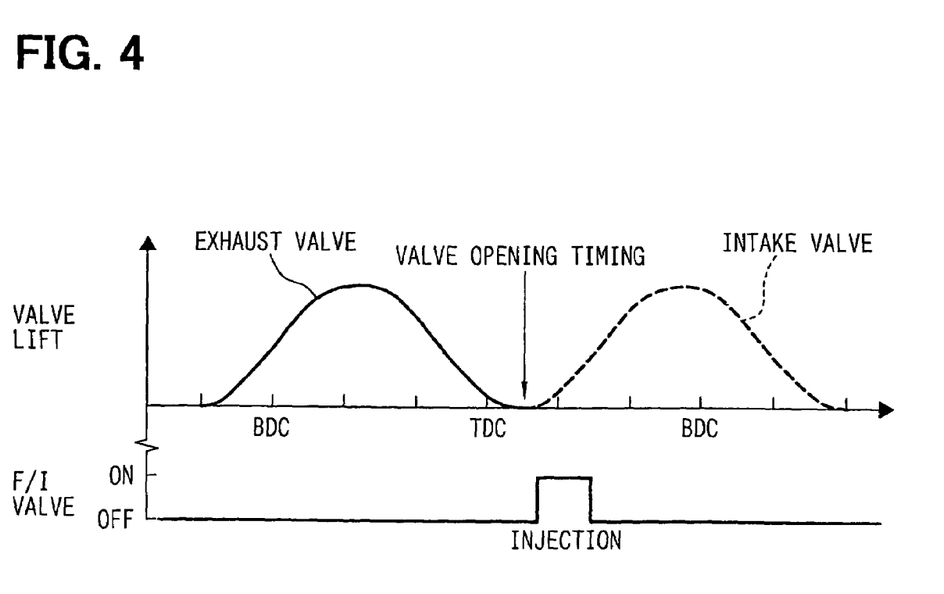
FIG. 4 is a time chart for explaining a fuel injection timing in the case that no valve overlap exists.

During the homogeneous combustion mode, the ECU 30 executes a routine shown in FIG. 2 to calculate a fuel injection timing, whereby it determines whether a valve overlap exists, in which both the intake valve 37 and the exhaust valve 38 are opened. When the valve overlap exists as shown in FIG. 3, the fuel injection is conducted in the valve overlap period. When no valve overlap exists as shown in FIG. 4, the fuel injection is conducted at or around a valve opening timing of the intake valve 37. The process of the routine shown in FIG. 2 is described in detail hereinafter.

The routine shown in FIG. 2 is executed in synchronization with calculation timing of fuel injection timing for individual cylinder. This routine corresponds to a fuel injection timing establishing means. In step 101, the computer reads an engine speed Ne. In step 102, it reads a required torque established based on a position of accelerator. In step 103, a target valve timing of the intake valve 37 and the exhaust valve 38 is calculated according to the engine running state, such as the engine speed Ne and the required torque, by means of a map. In step 104, the computer determines whether the valve overlap exists. Step 104 corresponds to a valve overlap determination means.

When it is determined the valve overlap exists in step 104, the procedure proceeds to step 105 in which a fuel injection timing is calculated within the valve overlap period according to the engine running state by means of the map. On the other hand, when it is No in step 104, the procedure proceeds to step 106 in which a fuel injection timing is established at the valve opening timing of the intake valve 37 or the vicinity thereof according to the engine running state by means of the map.

When the valve overlap exists, the amount of burned gas remaining in the cylinder increases to raise the temperature in the cylinder. Thus, the fuel injection timing is established within the valve overlap period, whereby atomization of the injected fuel is expedited due to a high temperature in the cylinder and the piston-wet is reduced. Even if the amount of injected fuel is large or the intensity of the airflow is low, the homogeneous air-fuel mixture is well formed to realize a stable homogeneous combustion.

When the no valve overlap exists, the fuel injection timing is established at a valve opening timing of the intake valve 37 or the vicinity thereof. Thus, the atomization of the injected fuel is expedited due to a decompressing evaporation, so that the fuel and the air are well mixed to form a preferable homogeneous mixture and the stable homogeneous combustion is realized.

In the first embodiment, the valve timing controllers 39, 40 are provided to both the intake valve and the exhaust valve. Alternatively, the valve timing controller 40 for the exhaust valve can be omitted. The present invention can be applied to a system which has a valve timing controller for only the intake valve.

[Second Embodiment]

The atomization of the fuel and the piston-wet are varied according to the temperature of the engine and/or viscosity of the fuel. For instance, when the engine 11 is well warmed, the temperature of the inner surface of the cylinder and the outer surface of the piston is increased, so that the atomization of the fuel is expedited to reduce the piston-wet. Thus, when the engine temperature is high enough, the fuel is well atomized and the piston-wet is reduced in the homogeneous mode even if the fuel injection timing is established within the valve overlap period.

When the fuel is comprised of heavy composition, the fuel is not well atomized even if the engine temperature is high. In such case, the same problem can be generated as the case that the engine temperature is low. Even if the fuel is comprised of light composition, when the engine temperature is low, the atomization of the fuel is not well conducted.

Figure 5:
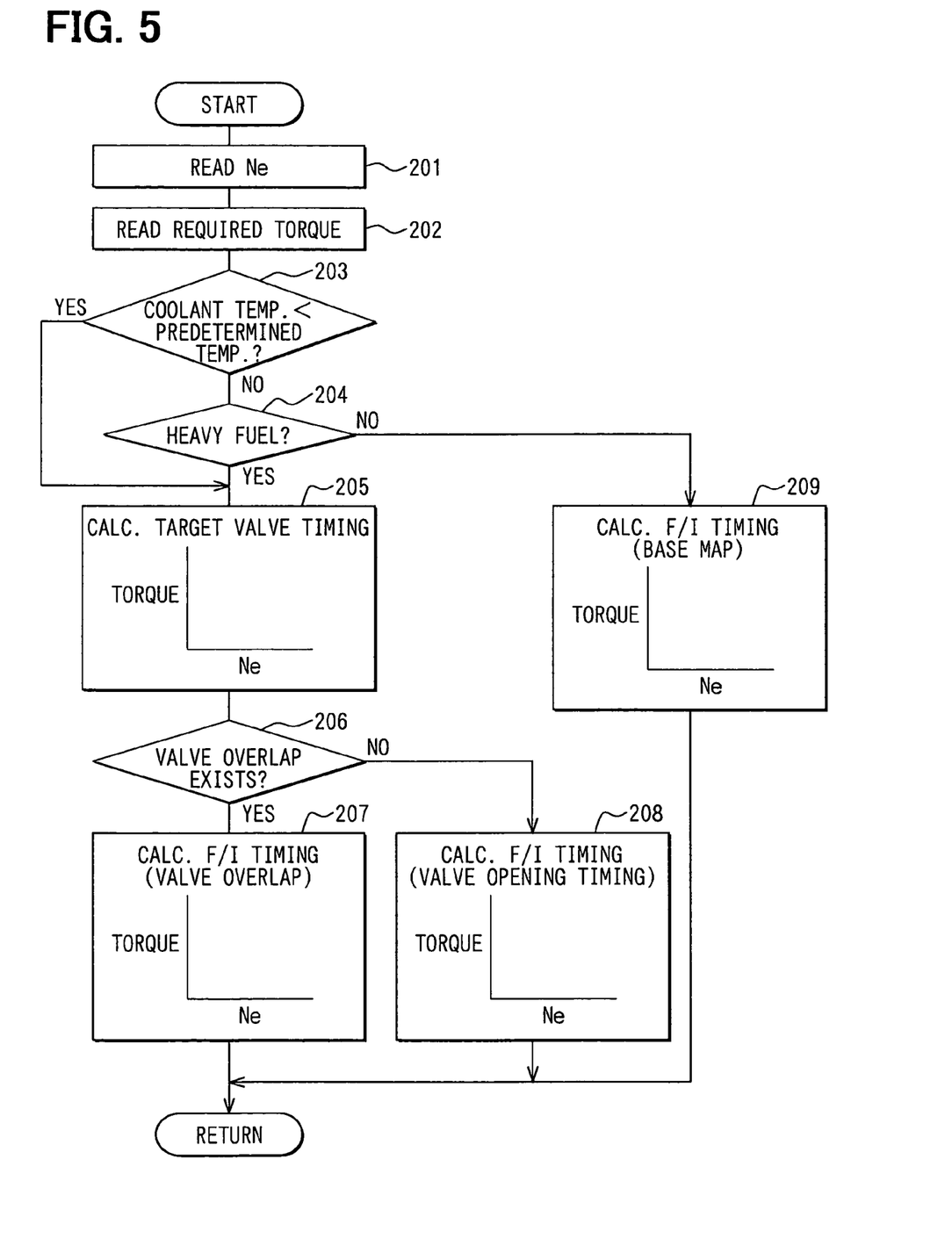
FIG. 5 is a flowchart showing a process of a fuel injection timing calculation routine according to a second embodiment.

According to the second embodiment, a routine shown in FIG. 5 is executed during the homogeneous combustion mode to establish the fuel injection timing. When a temperature of the engine coolant is lower than a predetermined value, and/or when the fuel is comprised of heavy composition, the fuel injection timing is established in the same way as the first embodiment. If not, it is determined that the fuel atomization is well performed and no piston-wet exists, so that the fuel injection timing is established according to the engine running state.

The ECU 30 corresponds to a fuel quality detecting means which determines a quality of the fuel according to a combustion stability at the engine starting and a deviation of the air-fuel ration at transient driving. Alternatively, the quality of the fuel can be detected according to an output signal of a fuel quality detecting sensor which is disposed in the fuel tank.

The routine shown in FIG. 5 is executed in synchronization with calculation timing of fuel injection timing for individual cylinder during the homogeneous combustion mode. In step 201, the computer reads an engine speed Ne. In step 202, it reads a required torque established based on a position of accelerator. In step 203, it is determined whether the coolant temperature detected by a coolant temperature sensor 23 is lower than a predetermined value which is an upper limit temperature in which the fuel atomization is not well generated and the piston-wet is generated. Thus, when the coolant temperature is lower than the predetermined value, it is determined the problem as to the fuel atomization and the piston wet can be possibly generated. In steps 205 to 208, when the valve overlap exists, the fuel injection timing is established within the valve overlap period, and when the valve overlap does not exist, the fuel injection timing is established at the valve opening timing of the intake valve 37 or the vicinity thereof as well as Steps 103 to 106 in FIG. 2.

On the other hand, when it is determined that the coolant temperature is above the predetermined value, the procedure proceeds to step 204 in which it is determined whether the injecting fuel is comprised of a heavy composition. When it is Yes in step 204, it is determined that the problem possibly arise as to the fuel atomization and the piston-wet. In steps 205 to 208, when the valve overlap exists, the fuel injection timing is established within the valve overlap period, and when the valve overlap does not exist, the fuel injection timing is established at the valve opening timing of the intake valve 37 or the vicinity thereof as well as Steps 103 to 106 in FIG. 2.

When it is determined that the injecting fuel is comprised of the light composition, it is determined that the problem as to the fuel atomization and the piston-wet do not arise even if the fuel injection timing is not established within the valve overlap period or at the vicinity of the valve opening timing of the intake valve 37. The procedure proceeds to step 209 in which the fuel injection timing is calculated according to the engine running state, such as the engine speed Ne and the required torque by means of the map.

According to the second embodiment, the fuel injection timing is established according to the presence/absence of the valve overlap only when the engine temperature is low and/or the injecting fuel is comprised of the heavy composition during the homogeneous combustion mode. If not, the fuel injection timing is properly established according to the engine running state, such as the engine temperature and the fuel quality, to realize a stable homogeneous combustion. Step 203 and/or step 204 can be omitted.

[Third Embodiment]

Figure 7:
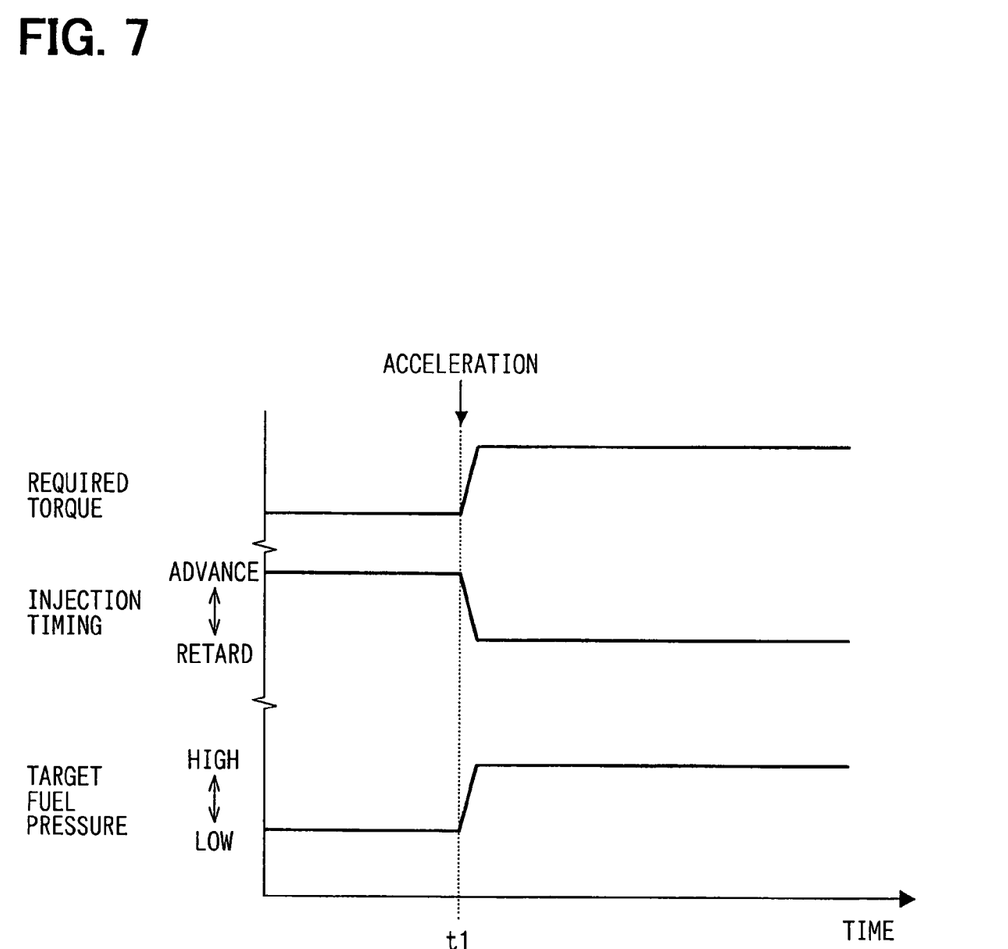
FIG. 7 is a time chart for explaining a relationship between a required torque, a fuel injection timing, and a target fuel pressure.

The DI engine is provided with a high-pressure pump which supplies a high-pressurized fuel to the each fuel injector 21. The pressure of the fuel discharged from the high-pressure pump is controllable and corresponds to the fuel pressure. As illustrated in FIG. 7, when an acceleration of the vehicle is required at the time of "t1", the required torque is increased and the fuel amount is also increased. In order to keep an atomizing period of the fuel, the fuel injection timing is retarded and the target fuel pressure is increased.

When the piston locates at the vicinity of the top dead center, the piston is close to the fuel injector 21. In such a situation, when the fuel is injected, the piston-wet increases. On the other hand, when the fuel injection timing is established at the vicinity of a bottom dead center (BDC), a period from the fuel injection timing to the ignition timing is reduced. Thus, when the fuel injection amount is large and/or the airflow intensity is low, the ignition can be carried out before the injected fuel is atomized enough.

Figure 6:
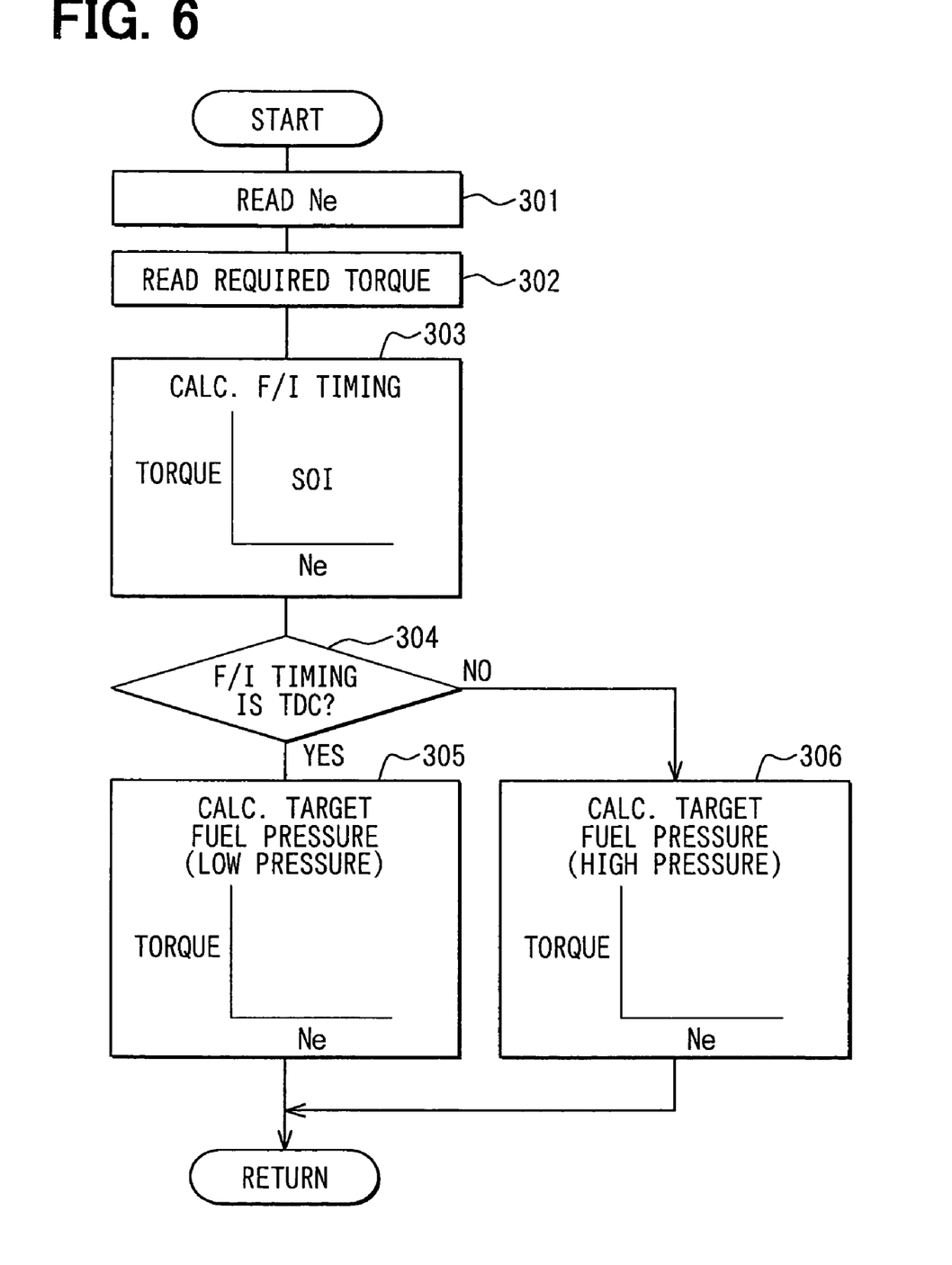
FIG. 6 is a flowchart showing a process of a target fuel pressure calculation routine according to a third embodiment.

According to the third embodiment, the routine shown in FIG. 6 is executed, whereby the target fuel pressure is decreased when the fuel injection timing is established at the vicinity of the top dead center. When the fuel injection timing is established at other than the top dead center, the target fuel pressure is increased. There are provided a target fuel pressure calculating map for low pressure and a target fuel pressure calculating map for high-pressure. When the fuel injection timing is established at the vicinity of the top dead center, the target fuel injection timing map for low pressure is used, and when the fuel injection timing in not established at the vicinity of the top dead center, the target fuel injection timing map for high pressure is used for calculating the target fuel pressure. In the case that the fuel injection timing is established at the vicinity of the top dead center, the target fuel pressure is decreased and the fuel injection period is increased, so that the fuel is injected while the piston slide down to reduce the piston-wet. On the other hand, in the case that the fuel injection timing is established at the vicinity of the bottom dead center, the target fuel pressure is increased and the fuel injection period is decreased, so that enough time for atomizing the injected fuel is obtained. The process of the routine shown in FIG. 6 is described hereinafter.

The routine shown in FIG. 6 is executed in synchronization with calculation timing of fuel injection timing for individual cylinder during the homogeneous combustion mode. This routine corresponds to a target fuel pressure establishing means. In step 301, the computer reads the engine speed Ne. In step 302, the computer reads the required torque according to the position of the accelerator. Then, the procedure proceeds to step 303 in which the fuel injection timing SOI is calculated according to the engine running state, such as the engine speed Ne and the required torque, by means of a map.

In step 304, it is determined whether the fuel injection timing SOI is established at the vicinity of the top dead center. If the fuel injection timing is established at the vicinity of the top dead center, the procedure proceeds to step 305, in which the target fuel pressure is calculated according to the engine running state, such as engine speed Ne and the required torque, by means of a target fuel injection timing calculation map for low pressure. On the other hand, when it is determined that the fuel injection timing SOI is not established at he vicinity of the top dead center, the procedure proceeds to step 306 in which the target fuel pressure is calculated according to the engine running state, such as the engine speed Ne and the required torque, by means of a target fuel injection timing calculation map for high pressure, whereby the target fuel pressure is increased.

According to the third embodiment, when the fuel injection timing is established at the vicinity of the top dead center, the target fuel pressure is decreased, whereby the piston-wet is reduced and the enough time is obtained for atomizing the injected fuel to realize a stable homogeneous combustion. Furthermore, when the fuel injection timing is not established at the vicinity of the top dead center, the target fuel pressure is decreased so that the fuel injection period is decreased to keep an enough period for atomizing the injected fuel.

In the third embodiment, there are provided the target fuel pressure calculation maps for low pressure and high pressure respectively. Alternatively, the target fuel pressure calculation map for low pressure can be omitted. When the fuel injection timing is established at the vicinity of the top dead center, the target fuel pressure derived from the target fuel pressure calculation map is corrected to decrease the target fuel pressure.

In the third embodiment, the target fuel pressure is established for low pressure and high pressure respectively. Alternatively, the fuel injection timing can be established at the vicinity of the top dead center, middle position between the top dead center and the bottom dead center, and the vicinity of the bottom dead center. According to the fuel injection timing, the target fuel pressure can be established for low pressure, middle pressure, and high pressure.

[Fourth Embodiment]

As described in the second embodiment, the piston-wet is varied according to the temperature of engine 11 and the quality of the fuel.

Figure 8:
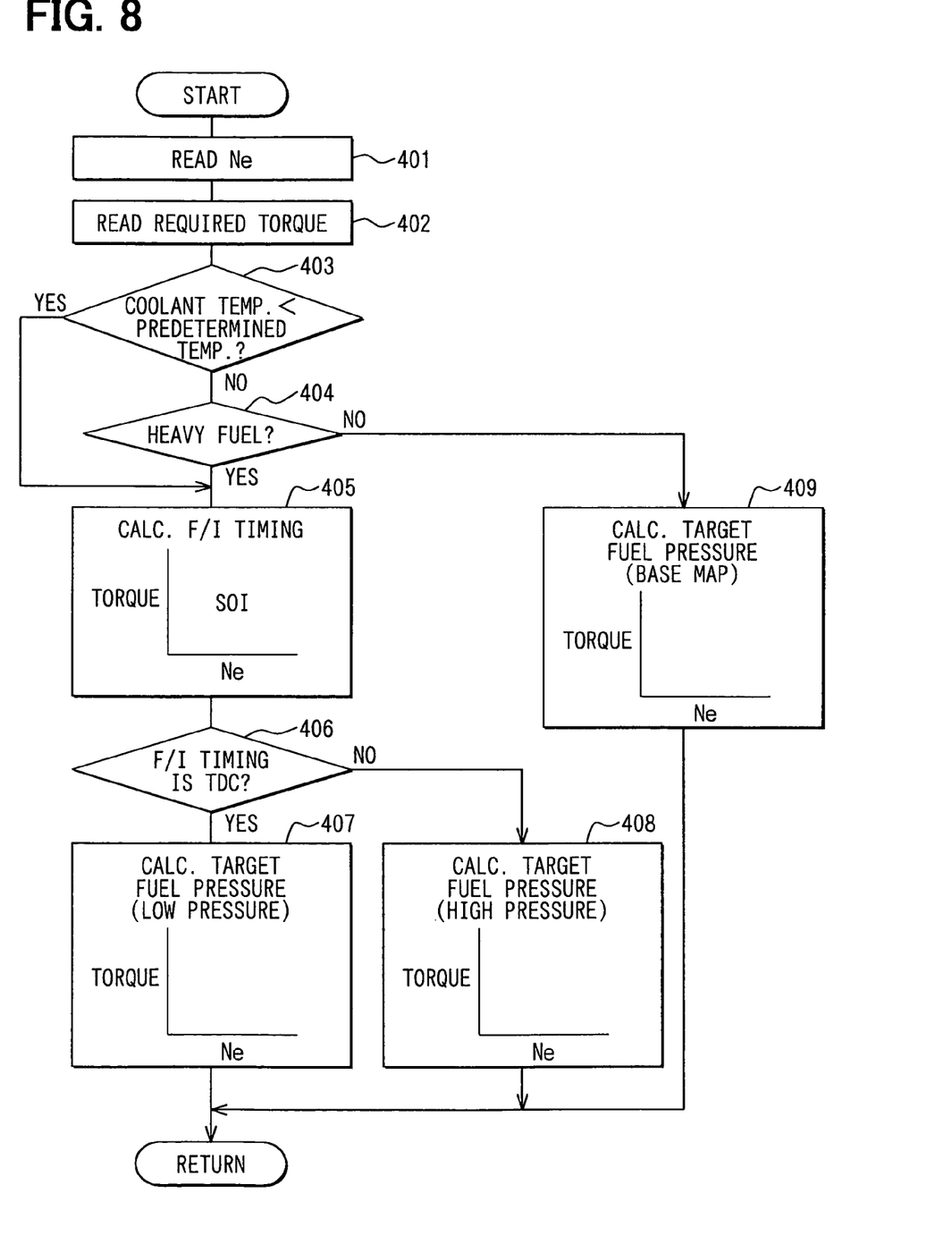
FIG. 8 is a flowchart showing a process of a target fuel pressure calculation routine according to a fourth embodiment.

According to the fourth embodiment, a routine shown in FIG. 8 is executed during the homogeneous combustion mode to establish the fuel injection timing. When a temperature of the engine coolant is lower than a predetermined value, and/or when the fuel is comprised of heavy composition, the fuel injection timing is established in the same way as the third embodiment. If not, it is determined that the fuel atomization is well performed and no piston-wet exists, so that the fuel injection timing is established according to the engine running state.

The routine shown in FIG. 8 is executed in synchronization with calculation timing of fuel injection timing for individual cylinder during the homogeneous combustion mode. In step 401, the computer reads the engine speed Ne. In step 402, the computer reads the required torque based on the position of the accelerator. Then, the procedure proceeds to step 403 in which it is determined whether the coolant temperature detected by the coolant temperature sensor 23 is lower than the predetermined value which is an upper limit temperature in which the fuel atomization is not well generated and the piston-wet is generated. Thus, when the coolant temperature is lower than the predetermined value, it is determined the problem as to the fuel atomization and the piston wet can be possibly generated. In steps 405 to 408, the target furl pressure is established according to the fuel injection timing in the same way as steps 303 to 306 in FIG. 6.

In step 404, when it is determined that the injected fuel is comprised of heavy compositions, the computer determines the problem as to the fuel atomization and the piston-wet will not be arose. The procedure proceeds to the step 409 in which the target fuel pressure is calculated according to the engine running state, such as the engine speed Ne and the required torque, by means of a base map.

According to the fourth embodiment, during the homogeneous combustion mode, only when the temperature of the engine is low and/or the injected fuel is comprised of the heavy compositions, the target fuel pressure is varied according to the fuel injection timing. When in other condition, the target fuel pressure is established according to the engine running state. Thereby, the optimum target fuel pressure of the homogeneous combustion mode is established according to the engine running state. Thus, a stable homogeneous combustion can be realized.

In the fourth embodiment, step 403 or step 404 can be omitted.

The first embodiment and the third embodiment can be combined.

What is claimed is:

1. A controller for a direct injection internal combustion engine provided with a valve timing controller of at least an intake valve, and provided with a function in which a fuel is directly injected into a cylinder during an intake stroke in order to conduct a homogeneous combustion, comprising:

a valve overlap determining means for determining whether a valve overlap period exists, in which both the intake valve and an exhaust valve are opened;

a fuel injection timing establishing means for establishing a fuel injection timing within the valve overlap period when the valve overlap exists.

2. The controller for a direct injection internal combustion engine according to claim 1, wherein the fuel injection timing establishing means establishes the fuel injection timing at a valve opening timing of the intake valve or the vicinity thereof when no valve overlap period exists.

3. The controller for a direct injection internal combustion engine according to claim 1, further comprising a coolant temperature detecting means for detecting a temperature of coolant for the engine, wherein the fuel injection timing establishing means establishes the fuel injection timing according to an engine running state without respect to a presence/absence of the valve overlap period when the temperature of coolant is higher than a predetermined value.

4. The controller for a direct injection internal combustion engine according to claim 1, further comprising a fuel quality detecting means for detecting a quality of the fuel, wherein the fuel injection timing establishing means establishes the fuel injection timing according to an engine running state without respect to a presence/absence of the valve overlap period when the fuel is comprised of light composition.

5. A controller for a direct injection internal combustion engine provided with a function in which a fuel is directly injected into a cylinder during an intake stroke in order to conduct a homogeneous combustion, and provided with a function in which a pressure of injecting fuel, which is referred to as a fuel pressure, is controlled, comprising:

a target fuel pressure establishing means for establishing a target control value of the fuel pressure, which is referred to as a target fuel pressure, according to an engine running state; and a fuel injection timing establishing means for establishing a fuel injection timing according to the engine running state, wherein the target fuel pressure establishing means decreases the target fuel pressure when the fuel injection timing is established at the vicinity of a top dead center of a piston.

6. The controller for a direct injection internal combustion engine according to claim 5, wherein the target fuel pressure establishing means increases the target pressure when the fuel injection timing is established at a vicinity of a bottom dead center of the piston.

7. The controller for a direct injection internal combustion engine according to claim 5, further comprising a coolant temperature detecting means for detecting a temperature of a coolant for the engine, wherein the target fuel pressure establishing means executes no correction of the target fuel pressure based on the fuel injection timing when the temperature of coolant is higher than a predetermined value.

8. The controller for a direct injection internal combustion engine according to claim 5, further comprising a fuel quality detecting means for detecting quality of the fuel, wherein the target fuel pressure establishing means no correction of the target fuel pressure based on the fuel injection timing when the fuel is comprised of light compositions.

9. A method of controlling a direct injection internal combustion engine, having a valve timing controller of at least an intake valve, in which a fuel is directly injected into a cylinder during an intake stroke in order to conduct a homogeneous combustion, the method comprising:

determining whether a valve overlap period exists, in which both the intake valve and an exhaust valve are opened; and establishing a fuel injection timing within the valve overlap period when the valve overlap exists.

10. The method according to claim 9, further comprising:
detecting a temperature of coolant for the engine, wherein
the fuel injection timing is established according to an engine running state without respect to a presence/absence of the valve overlap period when the temperature of coolant is higher than a predetermined value.

11. The method according to claim 9, further comprising:
detecting a quality of the fuel, wherein
the fuel injection timing is established according to an engine running state without respect to a presence/absence of the valve overlap period when the fuel is comprised of light composition.

12. A method of controlling a direct injection internal combustion engine, having a valve timing controller of at least an intake valve, in which a fuel is directly injected into a cylinder during an intake stroke in order to conduct a homogeneous combustion, the method comprising:

determining whether a valve overlap period exists, in which both the intake valve and an exhaust valve are opened;

establishing a fuel injection timing within the valve overlap period when the valve overlap exists; and establishing the fuel injection timing at a valve opening timing of the intake valve or the vicinity thereof when no valve overlap period exists.

13. A method of controlling a direct injection internal combustion engine in which a fuel is directly injected into a cylinder during an intake stroke in order to conduct a homogeneous combustion and in which a fuel pressure of injecting fuel is controlled, the method comprising:

establishing a target control value of the fuel pressure, which is referred to as a target fuel pressure, according to an engine running state; and establishing a fuel injection timing according to the engine running state, wherein the target fuel pressure is decreased when the fuel injection timing is established at the vicinity of a top dead center of a piston.

14. The method according to claim 13, wherein
the target pressure is increased when the fuel injection timing is established at a vicinity of a bottom dead center of the piston.

15. The method according to claim 13, further comprising:

detecting a temperature of a coolant for the engine, wherein no correction of the target fuel pressure is established based on the fuel injection timing when the temperature of coolant is higher than a predetermined value.

16. The method according to claim 13, further comprising:

detecting a quality of the fuel, wherein no correction of the target fuel pressure is established based on the fuel injection timing when the fuel is comprised of light compositions.

* * * * *